United States Patent [19]

Takahashi

[11] Patent Number: 4,550,433

[45] Date of Patent: Oct. 29, 1985

[54] APPARATUS FOR DISCRIMINATING A PAPER-LIKE MATERIAL

[75] Inventor: Hisashi Takahashi, Yokohama, Japan

[73] Assignee: Tokyo Shibaura Denki Kabushiki Kaisha, Japan

[21] Appl. No.: 528,106

[22] Filed: Aug. 31, 1983

[30] Foreign Application Priority Data

Sep. 27, 1982 [JP] Japan ............................... 57-166584

[51] Int. Cl.[4] ............................................... G06K 9/03

[52] U.S. Cl. ......................................... 382/7; 356/237

[58] Field of Search .................... 382/7; 250/562, 563; 356/71, 237, 394

[56] References Cited

U.S. PATENT DOCUMENTS

| | | | |
|---|---|---|---|
| 4,041,456 | 8/1977 | Ott et al. | 382/7 |
| 4,189,235 | 2/1980 | Guter et al. | 250/562 |
| 4,298,807 | 11/1981 | Favre | 250/562 |
| 4,352,988 | 9/1982 | Ishida | 250/559 |

*Primary Examiner*—Leo H. Boudreau
*Assistant Examiner*—Jacqueline Todd
*Attorney, Agent, or Firm*—Cushman, Darby & Cushman

[57] ABSTRACT

An apparatus can discriminate defects such as stains on bank notes by an optical scanner, A/D converter and comparing device. The apparatus comprises an optical scanner for projecting scanning light toward a detection area of the bank note which is being conveyed through the optical scanning device; a photoelectric converter for converting an optically scanned signal from the optical scanner into an electric analog signal whose level is substantially in proportion to the level of the optically scanned signal; an analog/digital converter for converting the electric analog signal into a digital signal; a timing control device for applying sampling pulses to the analog/digital converter so as to produce a sampled digital value from the analog/digital converter; a storing device for storing at least a presettable value which is used to discriminate the bank notes; and an arithmetic operation device for performing the arithmetic operation by introducing the sampled digital value and the presettable value and the presettable value so as to discriminate defects in the detection area of the bank notes.

4 Claims, 4 Drawing Figures

APPARATUS FOR DISCRIMINATING A PAPER-LIKE MATERIAL

BACKGROUND OF THE INVENTION

This invention relates to an apparatus for discriminating the physical condition of a paper-like material.

When circulated, the paper-like material such as bank notes, securities and cheques, sometimes meet problems such as fading of the original color of the material, contamination e.g., depositing of stains, and the printing ink drips from the material.

Various types of the apparatus as described in the preamble that may discriminate such stains deposited on the paper-like material have been proposed. For example, in the conventional apparatus the print patterns of the bank notes are optically picked up and then converted into the corresponding electrical signal, and thereafter the output voltage level of the electrical signal is electrically processed so as to determine the contamination of the bank notes. Such a conventional apparatus is disadvantageous in that it cannot reliably discriminate the print pattern of the notes whose output signal level changes sharply.

It is therefore a primary object of the invention to provide an apparatus which can discriminate exactly defects such as contamination without adverse influence from their print patterns.

It is a secondary object of the invention to provide an apparatus for discriminating defects in which the degree of the defect e.g., soiled material, namely a threshold level of variations on the output voltage level is presettable.

It is a third object of the invention to provide an apparatus for discriminating defects in which the area of the defect, e.g., soil of the material, namely a threshold level of variation duration periods on the output voltage level is presettable.

SUMMARY OF THE INVENTION

These objects are accomplished in the present invention by providing an apparatus for discriminating the physical condition of a paper-like material comprising optical scanning means for projecting scanning light toward a detection area of the paper-like material which is being conveyed through the optical scanning means, photoelectric converting means for converting an optically scanned signal from the optical scanning means into an electric analog signal whose level is substantially in proportion to the level of the optically scanned signal, analog/digital converting means for converting the electric analog signal into a digital signal, timing control means for applying sampling pulses to the analog/digital converting means so as to produce a sampled digital value from the analog/digital converting means, storing means for storing at least a presettable value which is used to discriminate the paper-like material, and arithmetic operation means for performing the arithmetic operation by introducing the sampled digital value and the presettable value so as to discriminate defects in the detection area of the paper-like material.

DETAILED DESCRIPTION OF THE PREFERRED EMBODIMENT

Figure 1:
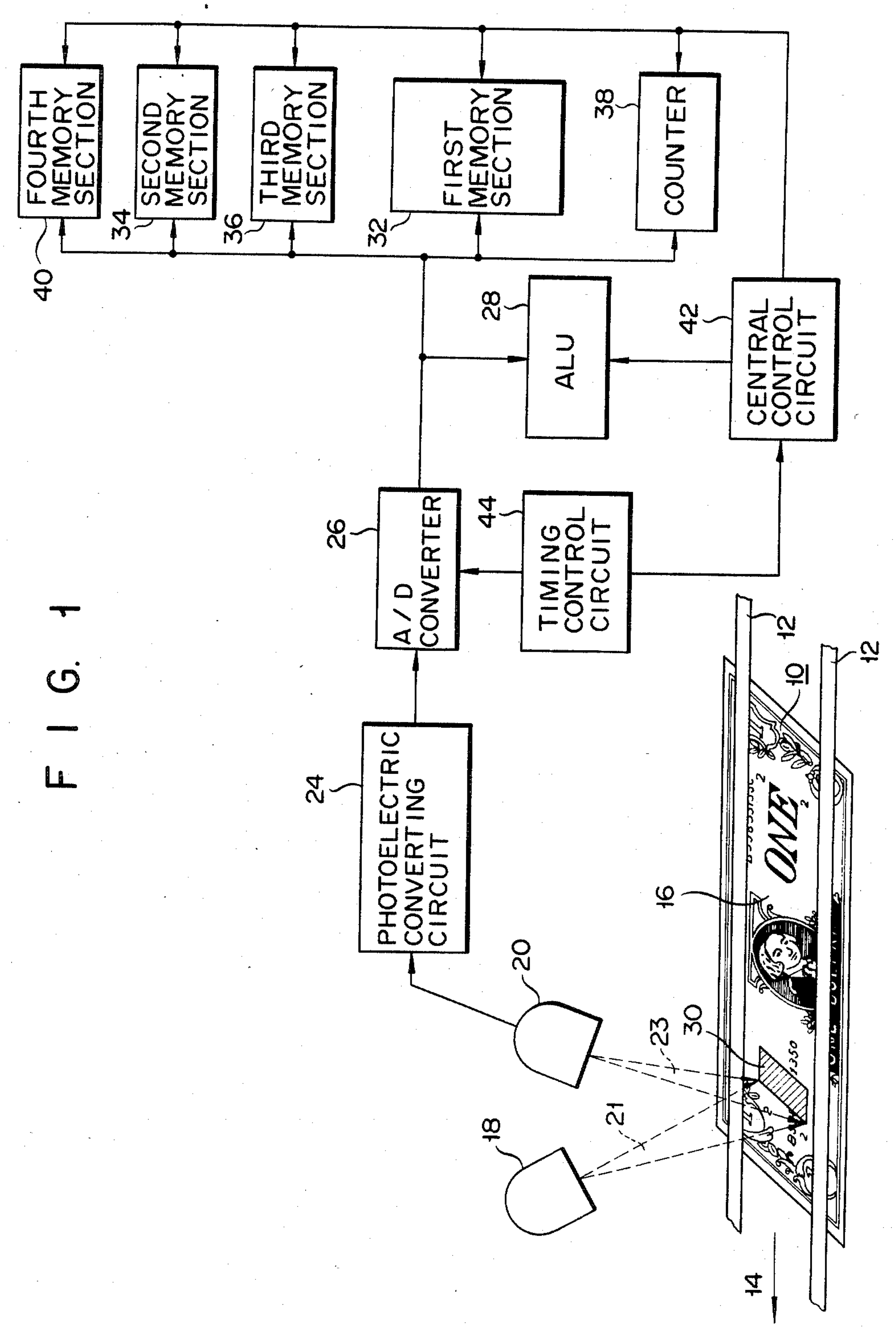
FIG. 1 is a schematic block diagram of an apparatus for discriminating a paper-like material according to one preferred embodiment of the present invention.

FIG. 1 shows a block diagram of an apparatus for discriminating a paper-like material according to a preferred embodiment.

The apparatus shown in FIG. 1 is so designed as to discriminate the physical condition of a bank note 10. First, the note 10 is conveyed in the direction of an arrow 14 along a convey path 12 at a given convey speed. A part of a front surface 16 of the note 10 is used as a detection area 30. For the sake of simplicity, a part of this detection area is indicated in the drawing by the hatched area. This area is optically scanned in the conveying direction 14 so as to establish the entire detection area 30. A light source 18, coupled to a power source (not shown), and a light receiver 20 are positioned apart at a given distance from the detection area 30 of the front surface 16 of the note 10. This optical system is arranged in such a manner that light rays 21 radiated from the light source 18 are incident upon the detection area 30. The light receiver 20 receives the rays 23 reflected from the detection area 30.

Secondly, the optical signal of the light receiver 20 is supplied to a photoelectric converting circuit and converted into a corresponding electric signal. The electric output signal from the photoelectric converting circuit 24 is applied to an A/D converter 26. An output terminal of the A/D converter 26 is connected to an arithmetic logic unit 28 and also to a first memory section 32, second memory section 34, a third memory section 36, a counter 38 and a fourth memory section 40.

A central control circuit 42 is provided in the apparatus. The output terminal of this circuit 42 supplies control signals to an arithmetic logic unit 28, a first memory section 32, a second memory section 34, a third memory section 36, a counter 38, and a fourth memory section 40. Further a timing control circuit 44 is provided to control the sampling timing of the A/D converter 26 and to apply its timing control information (sampling pulse signals) to the central control circuit 42.

The function of the A/D converter 26, as is well known, is to convert analog (electric) signals obtained by optically-scanning the detection area 30 of the note 10 into digital signals. In the present embodiment, the digital signals are sampled by sampling pulse signals generated in the timing control circuit 44 and, then, the sampled digital signals are applied to a processing circuit.

The first memory section 32 used as the main memory is functionally divided into a plurality of sub-regions for storing a standard pattern, an input pattern and data on the arithmetic operation. The second memory section 34 stores a level "E" (a first presettable value) which is used to produce a discrimination pattern, and the third memory section 36 stores a count "F" (a second presettable value). The arithmetic logic unit 28 (ALU) performs the arithmetic logic operation. The counter 38 is resettable and actuated by the ALU 28 and the third memory section 36. The central control circuit 42 controls the operations of the overall circuit. The fourth memory section 40 stores a third presettable value "K"

which is indicative of almost the entire note 10 being soiled.

It should be noted that the first presettable level "E" must be set to a given value smaller than the maximum value of the output voltage signal derived from the photoelectric converting circuit, and the second presettable count "F" must be set to a given value or number is smaller than all sampling numbers of the A/D converter 26 with respect to one note 10.

Figure 2:
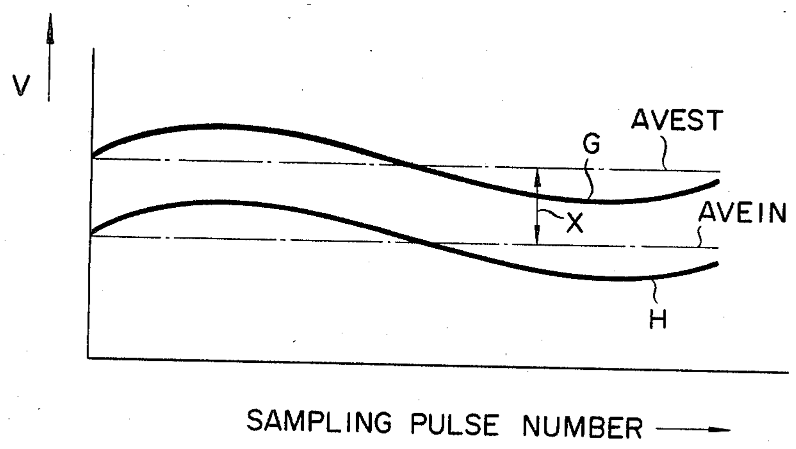
FIG. 2 is a graphic representation of an output voltage signal derived from an A/D converter 26, represented as analog signal waveforms.
Figure 3A:
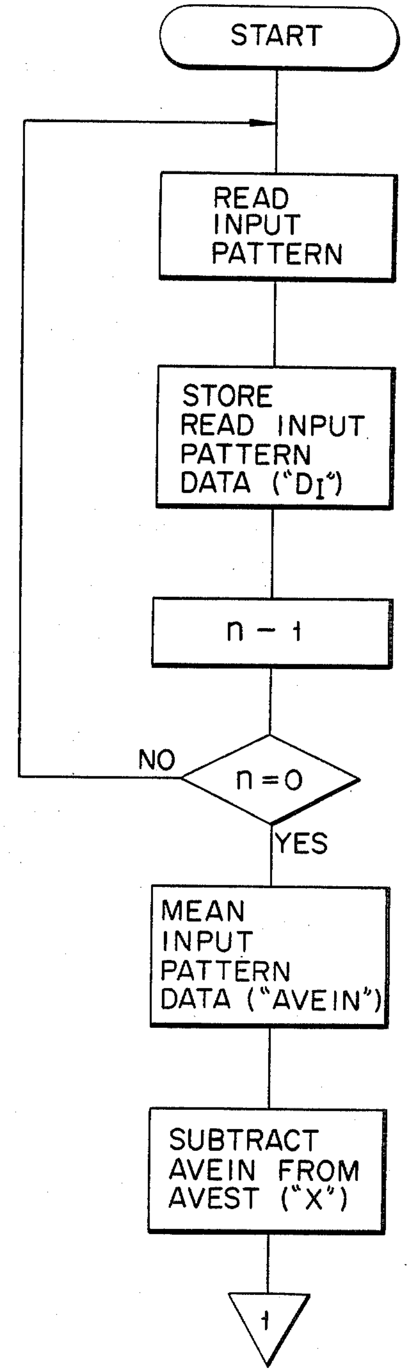
FIGS. 3A and 3B show flowchart of the discrimination operation carried by the apparatus shown in FIG. 1.
Figure 3B:
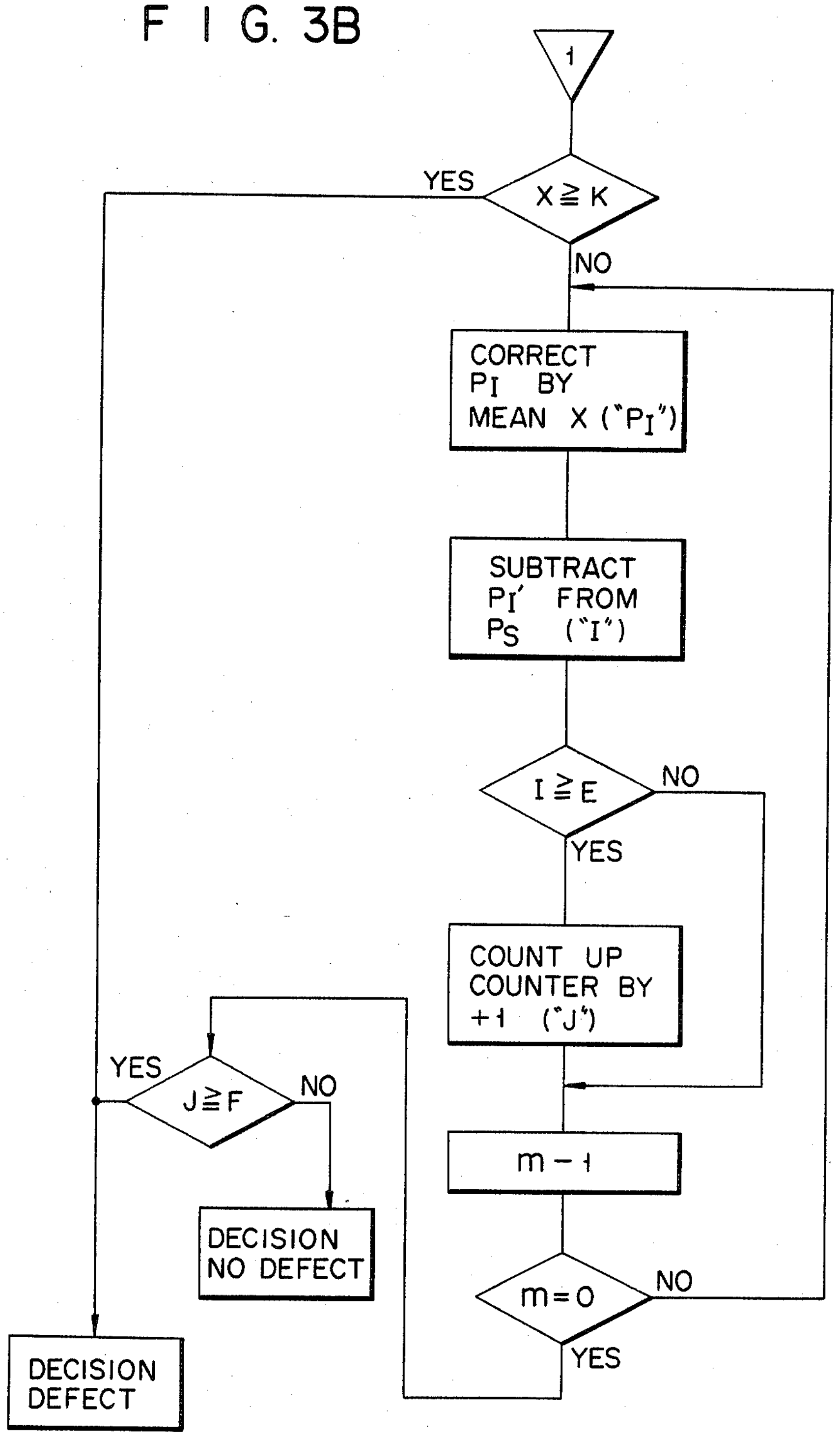

The operation of the circuit shown in FIG. 1 will be explained with reference to the waveforms of the sampled digital signals derived from the A/D converter 26 (represented as analog signal waveforms for the simplicity) as shown in FIG. 2 and the flow chart in FIG. 3.

First, a print pattern of a standard bank note (not shown) which is clean is optically scanned by the light source 18, the light receiver 20 and the photoelectric converting circuit 24. Precisely speaking, the print pattern defined by the hatched area 30 is scanned by the above optical means along the conveying direction 14. (Therefore, the scanned entire area of the print pattern is identical with the detection area 30 in this specification.) The output analog signals shown in FIG. 2 by a curve "G" are supplied to the A/D converter 26. The timing control circuit 44 may produce e.g., "n" sampling pulses and apply them to the A/D converter 26 while a pattern of one note is being read out. Accordingly, the A/D converter 26 converts the analog signal output from the photoelectric converting circuit 24 into the corresponding digital signal during generation of the sampling pulse, and the thus converted digital signal is stored as a standard pattern data "$P_S$" in the first memory section 32. When storing of the standard pattern data "$P_S$" is completed, in other words, the detection area 30 of the note 10 has been optically scanned in a longitudinal direction (conveying direction 14), the stored standard pattern data "$P_S$" is read from the first memory section 32 to ALU 28. From data "Ps" the average value (AVEST) is calculated (see FIG. 2). Thereafter the thus obtained average value (AVEST) is again stored in the first memory section 32. One advantage for performing this average value calculation (AVEST) is that reliable condition discrimination can be achieved since there is no essential difference between the output signal level of a standard bank note and that of a note of which the detection area 30 is slightly soiled. If the background color of a note gradually fades after a long period of circulation, the level of the output signal for the detection area 30 derived from the photoelectric converting circuit 24 is proportionally low. Accordingly, this low output signal level needs to be distinguished from the defect signal level. Up to this discrimination step, the production of the standard pattern data and its average value "AVEST" has been completed which implies the preparation of the initial data. The discrimination operation may be carried out in accordance with the flow chart in FIG. 3 based upon the initial data.

First, a note 10 to be discriminated for defects such as stains is optically scanned by the optical devices, which produce an output analog signal having a level "H" (see FIG. 2). The output analog signal is applied to the A/D converter 26. As easily seen from the waveform chart of FIG. 2, the level "H" of this output signal is lower than the level "G" of the output signal obtained by scanning the standard bank note. This means that the detection area 30 of the note 10 is soiled. When the analog signal having the level "H" is converted into a digital signal in the A/D converter 26 in such a manner that the A/D conversion is effected at each timing, the sampling pulse is applied to the A/D converter 26 from the timing control circuit 44. The resultant digital signal is stored as input pattern data "$P_I$" in the first memory section 32. Similarly n sampling pulses for the note 10 are applied to the A/D converter 26. In other words, A/D conversion is carried out n times.

After the detection area 30 of the note 10 is optically and electrically read out, the input pattern data "$P_I$" is read from the first memory section 32 and its average value (AVEIN) is calculated by ALU 28. An average value difference (X) in a digital value between this average value (AVEIN) and the previously obtained one (AVEST) for the standard pattern is also calculated by ALU 28. In this ALU 28, the difference (X) of the average values is used to correct the input pattern data for every sampling pulse, i.e., $$P_I + X = P_I'$$

Accordingly the input pattern data is shifted up if the difference (X) has a positive value, and is shifted down if the difference (X) has a negative value. In this embodiment the input pattern data "$P_I$" is shifted up since the difference (X) has a positive value (see FIG. 2).

Before the above-mentioned correction, it is determined whether the entire detection area 30 of the note 10 is soiled or not. That is, comparing the difference (X) for correction with a third presettable value (K) which is stored in advance in the fourth memory section 40, a decision is made that the note 10 is soiled in the entire region if "K" is greater than or equal to "X" (see flow chart of FIG. 3).

In the next step, the standard pattern data ($P_S$) is read from the first memory section 32 to ALU 28. In ALU 28, the corrected input pattern ($P_I'$) is subtracted from the standard pattern data ($P_S$) for every sampling pulse so as to obtain a second difference (I). Then the second difference (I) is compared with the first presettable level (E) stored in the second memory section 34. Only when "I" is greater than or equal to "E", the counter 38 counts up by "1". As was previously described, this counter is already initialized to "0". Such a comparison between the second difference (I) and the first presettable value (E) is repeated m times. This number, m, is equal to the number, n.

Preceding the next step, the count (J) of the counter 38 is compared with the second presettable value (F) stored in the third memory section 36. If "J" is smaller than "F", the note 10 has no defect. If "J" is greater than or equal to "F", it has a defect.

In accordance with such an apparatus for discriminating defects in paper-like material, it can reliably discriminate defects of any kind in the print patterns without adverse influence from the print patterns themselves. Moreover, the apparatus is very useful because the user can freely preset the degree of the stain, i.e., the first presettable value "E", and also the area of the stain i.e., the second presettable value "F".

While the present invention has been described using specific embodiments, it should be understood that other modifications and changes can be made without departing from the scope of the present invention.

Throughout the previous embodiments, two requirements, i.e., the degree and area of the stain, were employed as the discrimination conditions. It is however possible to introduce only one of these requirements as the discrimination condition. In the latter case, the discriminating operation is simplified and requires less time.

Furthermore, the third presettable value "K" stored in the fourth memory section may be omitted if the entire detection area of the paper-like material is not soiled.

Although the difference "I" was calculated after the input pattern data "$P_I$" had been corrected by the average value difference "X" and thereafter was compared with the first presettable value "E", the first presettable value "E" can be changed by the average value without average-correcting the input pattern data $P_I$. The counter counted up from "0" in the embodiment. The second presettable value "F" may be preset in the counter before the discriminating operation, and the counter may count down from the preset value, for example.

What is claimed is:

1. An apparatus for discriminating the physical condition of a paper like material comprising:

optical scanning means for projecting scanning light toward a detection area of the paper-like material which is being conveyed through the optical scanning means, said optical scanning means including a light source and a light receiver which are arranged such that the light radiated from the light source is directed to the detection area of the paper-like material and then reflected back to the light receiver;

photoelectric converting means for converting an optically scanned signal from the optical scanning means into an electric analog signal whose level is substantially in proportion to the level of the optically scanned signal;

analog/digital converting means for converting the electric analog signal into a digital signal;

timing control means for applying sampling pulses to the analog/digital converting means so to produce a sampled digital value from the analog/digital converting means;

storing means for storing at least a first presettable value, smaller than a maximum value of the sampled digital value, which is used to discriminate a physical condition of the paper-like material, said storing means including a first memory section which stores the sampled digital value as an input pattern data and a standard digital value obtained as a standard pattern data from a standard paper-like material, and a second memory section which stores the first presettable value; and arithemetic operation means for (a) calculating an average value of the input pattern data, (b) subtracting the averaged input pattern data value from the standard pattern data value, (c) correcting the input pattern data by the averaged value, (d) subtracting the corrected input pattern data value from the standard pattern data value, and finally (e) comparing the thus subtracted value with the first presettable value so as to discriminate defects in the detection area of the paper-like material.

2. An apparatus as claimed in claim 1, wherein:

the apparatus further comprises counting means which is coupled to the storing means and the arithmetic operation means;

the storing means further includes a third memory section which stores a second presettable value smaller than the number of the sampling pulses; and the arithmetic operation means which further actuates the counting means by a predetermined number when the subtracted value is greater than or equal to the first presettable value, and compares the final value of the counting means with the second presettable value so as to discriminate defects in the detection area of the paper-like material.

3. An apparatus as claimed in claim 2, wherein:

the storing means further includes a fourth memory section which stores a third presettable value; and the arithmetic operation means which further compares the value obtained by subtracting the averaged input pattern data value from the standard pattern data value with the third presettable value so as to discriminate defects in the detection area of the paper-like material.

4. An apparatus as claimed in claim 3 wherein said first, second and third presettable values are each preset in accordance with predetermined physical conditions of the paper-like material.

* * * * *